(12) United States Patent
Sugimoto

(10) Patent No.: US 11,140,331 B2
(45) Date of Patent: Oct. 5, 2021

(54) IMAGE CAPTURING APPARATUS, CONTROL METHOD FOR IMAGE CAPTURING APPARATUS, AND CONTROL PROGRAM FOR IMAGE CAPTURING APPARATUS

(71) Applicant: FUJIFILM Corporation, Tokyo (JP)

(72) Inventor: Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 91 days.

(21) Appl. No.: 16/695,207

(22) Filed: Nov. 26, 2019

(65) Prior Publication Data

US 2020/0099841 A1   Mar. 26, 2020

Related U.S. Application Data

(63) Continuation of application No. PCT/JP2018/014184, filed on Apr. 3, 2018.

(30) Foreign Application Priority Data

Jun. 21, 2017   (JP) .............................. JP2017-121444

(51) Int. Cl.
*H04N 5/235* (2006.01)
*H04N 5/232* (2006.01)

(52) U.S. Cl.
CPC ....... *H04N 5/2352* (2013.01); *H04N 5/23235* (2013.01)

(58) Field of Classification Search
CPC ............. H04N 5/2328; H04N 5/23287; H04N 5/23209; H04N 5/23245; H04N 5/23258; G03B 2205/00; G03B 5/00
See application file for complete search history.

(56) References Cited

U.S. PATENT DOCUMENTS

| 8,149,313 | B2 | 4/2012 | Watanabe et al. |
| 8,289,433 | B2 | 10/2012 | Hara et al. |
| 2002/0012064 | A1 | 1/2002 | Yamaguchi |
| 2007/0058064 | A1 | 3/2007 | Hara et al. |

(Continued)

FOREIGN PATENT DOCUMENTS

| CN | 1933558 | 3/2007 |
| CN | 101969534 | 2/2011 |

(Continued)

OTHER PUBLICATIONS

"Office Action of China Counterpart Application", dated Nov. 30, 2020, with English translation thereof, p. 1-p. 15.

(Continued)

*Primary Examiner* — Nelson D. Hernández Hernández
(74) *Attorney, Agent, or Firm* — JCIPRNET

(57) ABSTRACT

An image capturing apparatus includes: an image sensor that outputs an image signal obtained by image capturing of a photographic subject by an imaging device through an image capturing optical system; a display that displays a captured image based on the image signal; and a processor configured to perform control to display, on the display, images in a plurality of division regions obtained by dividing a division target region that includes a photographic subject image in the captured image as images in the respective division regions among which a degree of exposure differs.

14 Claims, 12 Drawing Sheets

(56) References Cited

U.S. PATENT DOCUMENTS

| | | | | |
|---|---|---|---|---|
| 2009/0128640 A1* | 5/2009 | Yumiki | ............... | H04N 5/23254 |
| | | | | 348/208.6 |
| 2010/0214436 A1* | 8/2010 | Kim | ....................... | H04N 9/735 |
| | | | | 348/223.1 |
| 2011/0019019 A1 | 1/2011 | Liu | | |
| 2015/0350555 A1* | 12/2015 | Nishi | ................ | H01L 27/14627 |
| | | | | 348/333.02 |
| 2016/0112644 A1 | 4/2016 | Nishi | | |

FOREIGN PATENT DOCUMENTS

| | | | |
|---|---|---|---|
| JP | 2001333329 | | 11/2001 |
| JP | 2007081772 | | 3/2007 |
| JP | 2007288449 A | * | 11/2007 |
| JP | 2009290818 | | 12/2009 |
| JP | 2011015092 | | 1/2011 |
| JP | 2014110607 | | 6/2014 |
| JP | 2016187172 | | 10/2016 |
| WO | 2014192152 | | 12/2014 |

OTHER PUBLICATIONS

"International Search Report (Form PCT/ISA/210) of PCT/JP2018/014184", dated Jul. 3, 2018, with English translation thereof, pp. 1-5.

"Written Opinion of the International Searching Authority (Form PCT/ISA/237) of PCT/JP2018/014184", dated Jul. 3, 2018, with English translation thereof, pp. 1-12.

Office Action of China Counterpart Application, with English translation thereof, dated May 17, 2021, pp. 1-16.

* cited by examiner

ENTIRE LIVE PREVIEW IMAGE AMOUNT OF LIGHT 1/2

IMAGE CAPTURING APPARATUS, CONTROL METHOD FOR IMAGE CAPTURING APPARATUS, AND CONTROL PROGRAM FOR IMAGE CAPTURING APPARATUS

CROSS-REFERENCE TO RELATED APPLICATIONS

This application is a Continuation of PCT International Application No. PCT/JP 2018/014184 filed on Apr. 3, 2018, which claims priority under 35 U.S.C § 119(a) to Japanese Patent Application No. 2017-121444 filed on Jun. 21, 2017. Each of the above application(s) is hereby expressly incorporated by reference, in its entirety, into the present application.

BACKGROUND OF THE INVENTION

1. Field of the Invention

A technique of the present disclosure relates to an image capturing apparatus, a control method for an image capturing apparatus, and a control program for an image capturing apparatus.

2. Description of the Related Art

For an image capturing apparatus in which image capturing of a photographic subject is performed by an imaging device through an image capturing optical system, a technique for performing image capturing through an ND (neutral density) filter is known. As a technique for attaining an effect equivalent to that attained by providing a physical ND filter in the image capturing optical system, a technique called a digital ND filter process (hereinafter simply referred to as "ND filter process") is known.

For example, JP2016-187172A discloses a technique in which an image is divided into a plurality of partial regions and the effect of an ND filter process is gradually made different among the division regions.

JP2014-110607A and JP2009-290818A disclose a technique in which images among which the effect of image processing differs are arranged and displayed to compare the effects of image processing.

SUMMARY OF THE INVENTION

With the technique described in JP2016-187172A, it might not be always possible to compare the effects of image processing for a photographic subject image and it may be difficult to compare the effects. With the technique disclosed by JP2014-110607A and JP2009-290818A described above, it is possible to compare the images among which the effect of image processing differs; however, it might not be always possible to compare the effects of image processing for a photographic subject image and it may be difficult to compare the effects.

The present disclosure has been made in view of the above-described circumstances, and an object thereof is to provide an image capturing apparatus, a control method for an image capturing apparatus, and a control program for an image capturing apparatus with which it is possible to perform image capturing while comparing the effects of an ND filter.

To achieve the above-described object, an image capturing apparatus according to a first aspect of the present disclosure includes: an image sensor (hereinafter, referred to as an image capturing unit) that outputs an image signal obtained by image capturing of a photographic subject by an imaging device through an image capturing optical system; a display (hereinafter, referred to as a display unit) that displays a captured image based on the image signal; and a processor (hereinafter referred to as a control unit) configured to perform control to display, on the display unit, images in a plurality of division regions obtained by dividing a division target region that includes a photographic subject image in the captured image as images in the respective division regions among which a degree of exposure differs.

An image capturing apparatus according to a second aspect is the image capturing apparatus according to the first aspect in which the control unit is configured to make the degree of exposure different among the plurality of division regions by a predetermined ratio in a direction in which the plurality of division regions are arranged.

An image capturing apparatus according to a third aspect is the image capturing apparatus according to the first or second aspect in which the number of the plurality of division regions is a number corresponding to a size of the photographic subject image.

An image capturing apparatus according to a fourth aspect is the image capturing apparatus according to any one of the first to third aspects in which the division target region is divided in a direction corresponding to a shape of the division target region.

An image capturing apparatus according to a fifth aspect is the image capturing apparatus according to the first aspect in which the control unit is configured to extract, from the captured image as the division target region, at least one photographic subject region that is a partial region of the captured image and that includes a photographic subject image, and to perform control to display, on the display unit, images in a plurality of division regions obtained by dividing the extracted photographic subject region as images in the respective division regions among which a degree of exposure differs.

An image capturing apparatus according to a sixth aspect is the image capturing apparatus according to any one of the first to fifth aspects in which the control unit is configured to divide the captured image into a plurality of captured image regions different from the plurality of division regions and to control a degree of exposure of an captured image region, among the plurality of captured image regions, for which the control unit controls the degree of exposure to a degree of exposure of an image corresponding to one of the plurality of division regions.

An image capturing apparatus according to a seventh aspect is the image capturing apparatus according to the sixth aspect in which the plurality of division regions are each include part of the captured image region for which the degree of exposure is controlled.

An image capturing apparatus according to an eighth aspect is the image capturing apparatus according to any one of the first to fifth aspects in which the control unit is configured to control a degree of exposure of the captured image to a degree of exposure corresponding to an image that corresponds to a division region selected from among the plurality of division regions displayed on the display unit.

An image capturing apparatus according to a ninth aspect is the image capturing apparatus according to the sixth or seventh aspect in which the control unit is configured to set a region having a brightness higher than a predetermined threshold value in the captured image as the captured image region for which the control unit controls the degree of exposure.

An image capturing apparatus according to a tenth aspect is the image capturing apparatus according to any one of the sixth to ninth aspects in which the control unit is configured to derive a histogram that represents a correspondence between a brightness of the captured image and the number of pixels and to use a boundary line derived from the captured image on the basis of a brightness, in the histogram, satisfying a predetermined condition to divide the captured image into the plurality of captured image regions.

An image capturing apparatus according to an eleventh aspect is the image capturing apparatus according to the tenth aspect in which the control unit is configured to set a brightness value corresponding to a valley between peaks of the brightness value in the histogram as the brightness of the boundary line.

An image capturing apparatus according to a twelfth aspect is the image capturing apparatus according to the tenth or eleventh aspect in which in a case where a first resolution that represents a unit with which the degree of exposure is controlled is lower than a second resolution of the captured image, the control unit is configured to divide the captured image into a plurality of regions by using the boundary line in accordance with the second resolution, and to divide the captured image into a plurality of captured image regions corresponding to the first resolution on the basis of the plurality of regions.

An image capturing apparatus according to a thirteenth aspect is the image capturing apparatus according to any one of the first to twelfth aspects in which the control unit is configured to further control a dynamic range of the division target region.

A control method for an image capturing apparatus according to a fourteenth aspect includes a process including: displaying, on a display unit, a captured image based on an image signal obtained by image capturing of a photographic subject by an imaging device through an image capturing optical system; and performing control to display, on the display unit, images in a plurality of division regions obtained by dividing a division target region that includes a photographic subject image in the captured image as images in the respective division regions among which a degree of exposure differs.

A control program for an image capturing apparatus according to a fifteenth aspect causes a computer to perform a process including: displaying, on a display unit, a captured image based on an image signal obtained by image capturing of a photographic subject by an imaging device through an image capturing optical system; and performing control to display, on the display unit, images in a plurality of division regions obtained by dividing a division target region that includes a photographic subject image in the captured image as images in the respective division regions among which a degree of exposure differs.

According to the present disclosure, it is possible to perform image capturing while comparing the effects of an ND filter.

DESCRIPTION OF THE PREFERRED EMBODIMENTS

Hereinafter, an example embodiment of the technique of the present disclosure will be described in detail with reference to the drawings.

Figure 1:
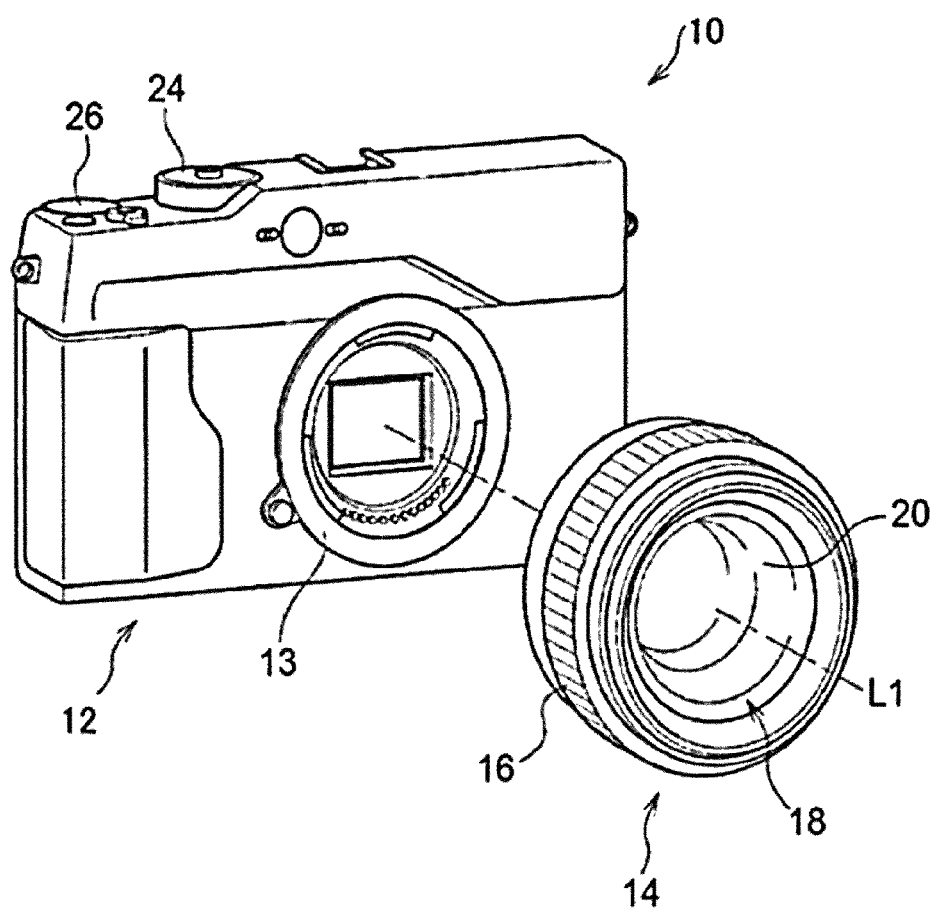
FIG. 1 is a perspective view illustrating an example external appearance of an image capturing apparatus according to an embodiment.

First, an example configuration of an image capturing apparatus 10 of this embodiment will be described with reference to FIG. 1 to FIG. 3. As illustrated in FIG. 1, for example, the image capturing apparatus 10 of this embodiment is an interchangeable-lens digital camera and includes an image capturing apparatus main body 12 and an image capturing lens 14.

The image capturing lens 14 is attached to the image capturing apparatus main body 12 so as to be interchangeable. On the lens barrel of the image capturing lens 14, a focus ring 16 that is used in a manual focus mode is provided. The image capturing lens 14 includes a lens unit 18. The lens unit 18 of this embodiment is an example of an image capturing optical system of the present disclosure.

The lens unit 18 is a combination lens in which a plurality of lenses including a focus lens 20 are combined. The focus lens 20 moves in the direction of an optical axis L1 in accordance with a manual rotation operation of the focus ring 16, and photographic subject light, which is reflected light representing a photographic subject, forms an image on a photosensitive surface 22A of an imaging device 22 (see FIG. 3) described below at an in-focus position corresponding to the distance to the photographic subject.

On the top surface of the image capturing apparatus main body 12, a dial 24 and a release button 26 are provided. The dial 24 is operated for various settings, such as switching between an image capture mode and a playback mode. Accordingly, in the image capturing apparatus 10, when the dial 24 is operated by the user, the image capture mode or the playback mode is selectively set as an operation mode.

As the operation mode for image capturing, the image capturing apparatus 10 has a still-image capture mode and a moving-image capture mode. The still-image capture mode is an operation mode for recording a still image obtained by image capturing of a photographic subject by the image capturing apparatus 10. The moving-image capture mode is an operation mode for recording a moving image obtained by image capturing of a photographic subject by the image capturing apparatus 10.

The release button 26 is configured to be capable of detecting a depressing operation in two stages, that is, an image capture preparation instruction state and an image capture instruction state. The image capture preparation instruction state refers to a state where, for example, the release button 26 is depressed from a standby position to an intermediate position (a half-push position), and the image capture instruction state refers to a state where the release button 26 is depressed to a final depress position (full-push position) beyond the intermediate position. Hereinafter, the "state where the release button 26 is depressed from the standby position to the half-push position" is called "half-push state", and the "state where the release button 26 is depressed from the standby position to the full-push position" is called "full-push state".

In an autofocus mode, when the release button 26 is set to the half-push state, image capture conditions are adjusted, and thereafter, when the release button 26 is subsequently set to the full-push state, actual exposure is performed. That is, when the release button 26 is set to the half-push state, an AE (auto-exposure) function is activated and the exposure state is set, and thereafter, an AF (autofocus) function is activated and in-focus control is performed. When the release button 26 is set to the full-push state, image capturing is performed.

Figure 2:
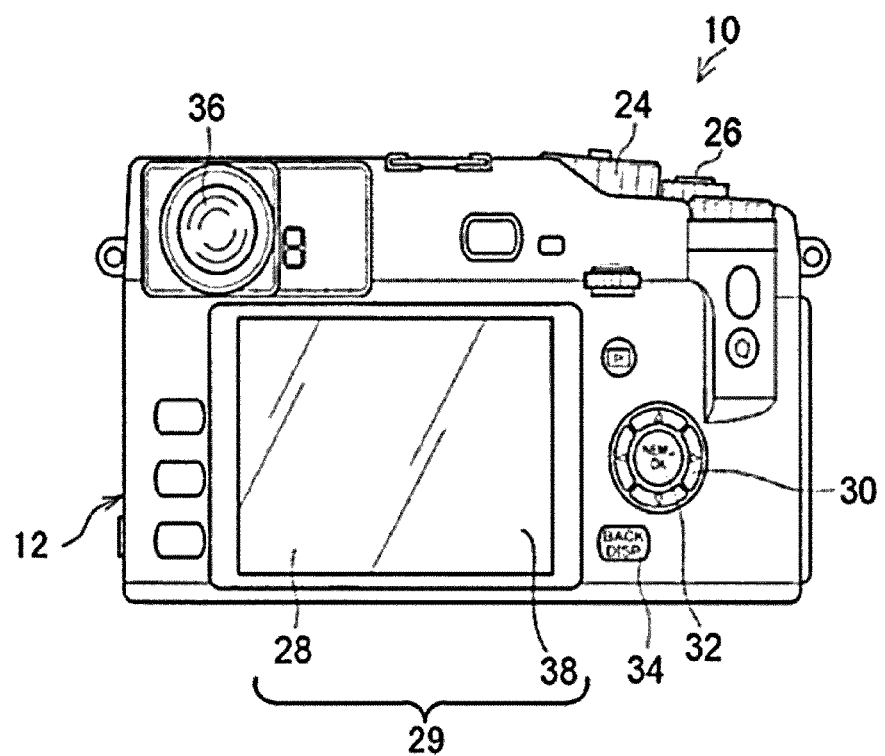
FIG. 2 is a rear view illustrating an example external appearance of the rear surface side of the image capturing apparatus according to the embodiment.

As illustrated in FIG. 2, for example, on the rear surface of the image capturing apparatus main body 12, a display 28, a cross key 30, a MENU/OK key 32, a BACK/DISP button 34, a viewfinder 36, and a touch panel 38 are provided.

The display 28 is, for example, an LCD (liquid crystal display) and displays an image obtained by image capturing of a photographic subject by the image capturing apparatus 10, text, and so on. The display 28 of this embodiment is an example of a display unit of the present disclosure. The display 28 of this embodiment and the touch panel 38 constitute a touch panel display 29. The display 28 is used to display a live preview image in the image capture mode. The live preview image is also called a through-image and is a series of frame images obtained by the imaging device 22 of the image capturing apparatus 10 performing image capturing of a photographic subject as a series of frames. In a case where an instruction for still-image capturing is given, the display 28 is used to also display a still image obtained by single-frame image capturing. Further, the display 28 is used to also display a playback image in the playback mode, a menu screen, and so on.

On the surface of a display region of the display 28, the touch panel 38 of a transparent type is overlaid. The touch panel 38 senses, for example, a touch of an instructing object, such as a finger or a stylus pen. The touch panel 38 outputs, to a predetermined output destination (for example, a CPU (central processing unit) 74 described below, see FIG. 3), sensing result information indicating the sensing result, such as the presence or absence of a touch of an instructing object on the touch panel 38, at predetermined intervals of, for example, 100 milliseconds. In a case where the touch panel 38 senses a touch of an instructing object, the sensing result information includes two-dimensional coordinates (hereinafter referred to as "coordinates") with which the position at which the instructing object touches the touch panel 38 can be identified. In a case where the touch panel 38 does not sense a touch of an instructing object, the sensing result information does not include the coordinates.

The cross key 30 functions as a multifunction key for selecting one or more menus and for outputting instruction detail signals corresponding to various instructions including zooming, frame-by-frame playback, and so on. The MENU/OK key 32 is an operation key having both the function of a menu (MENU) button for giving an instruction for displaying one or more menus on the screen of the display 28 and the function of an accepting (OK) button for, for example, confirming a selection and giving an instruction for execution. The BACK/DISP button 34 is used in a case of, for example, erasing a desired target, such as a selected item, cancelling a specification, or returning to the previous operation state.

Figure 3:
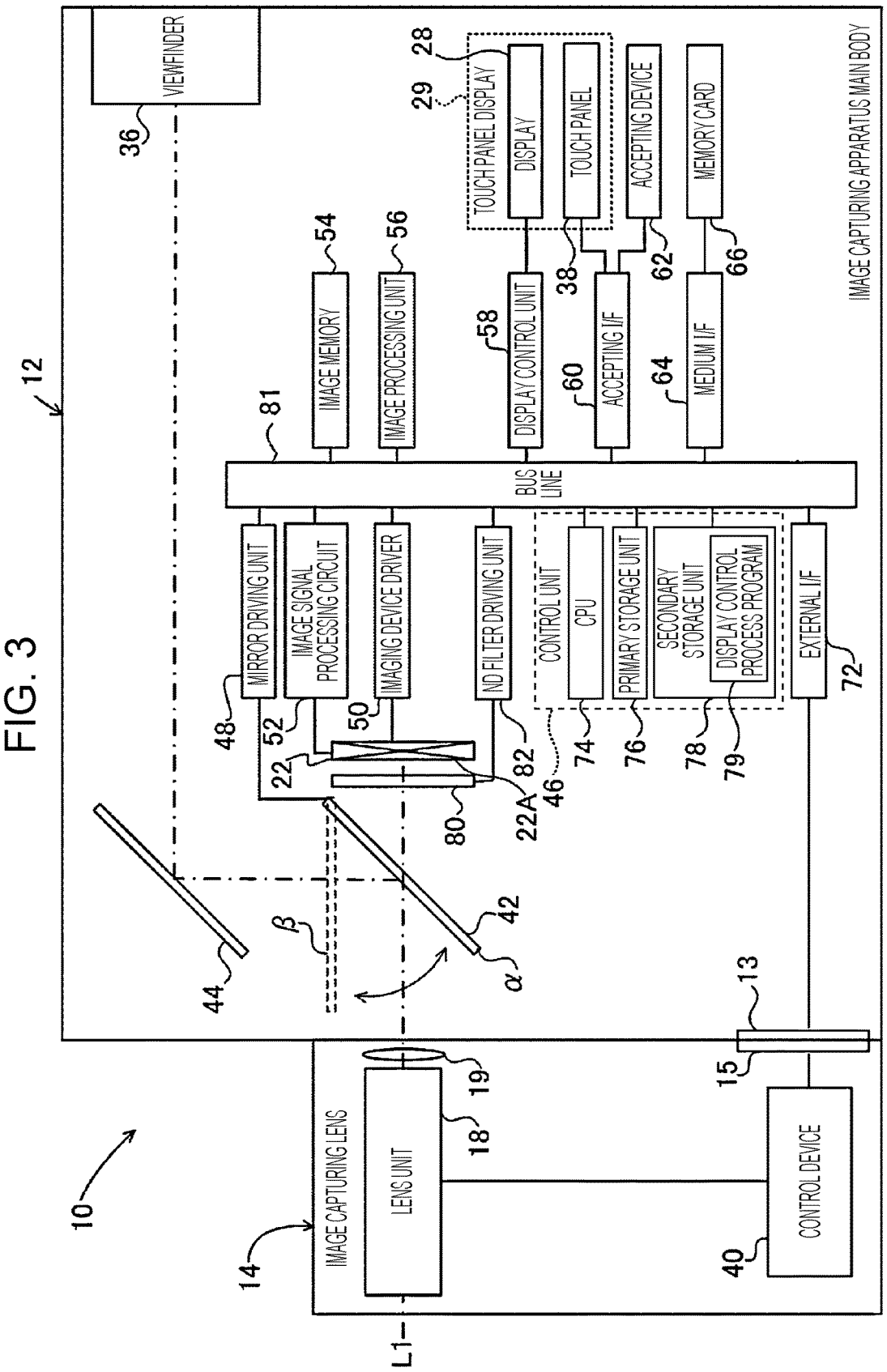
FIG. 3 is a block diagram illustrating an example hardware configuration of the image capturing apparatus according to the embodiment.

FIG. 3 is a block diagram illustrating an example hardware configuration of the image capturing apparatus 10 of this embodiment.

As illustrated in FIG. 3, the image capturing apparatus main body 12 of this embodiment includes a mount 13 (see also FIG. 1), and the image capturing lens 14 includes a mount 15. When the mount 15 is coupled with the mount 13, the image capturing lens 14 is attached to the image capturing apparatus main body 12 so as to be interchangeable.

The image capturing lens 14 includes the lens unit 18 described above, an aperture diaphragm 19, and a control device 40. When the mount 15 is connected with the mount 13, the control device 40 is electrically connected to the CPU 74 through an external I/F (interface) 72 of the image capturing apparatus main body 12 to control the image capturing lens 14 as a whole in accordance with instructions from the CPU 74.

The aperture diaphragm 19 is provided on the image capturing apparatus main body 12 side relative to the lens unit 18. To the aperture diaphragm 19, a diaphragm driving unit and a diaphragm driving motor not illustrated are connected. The diaphragm driving unit is controlled by the control device 40 to operate the diaphragm driving motor in accordance with an instruction accepted by an accepting device 62 described below to adjust the size of the aperture of the aperture diaphragm 19, thereby adjusting the amount of photographic subject light that has passed though the lens unit 18 and guiding the photographic subject light into the image capturing apparatus main body 12.

As illustrated in FIG. 3, the image capturing apparatus main body 12 of this embodiment includes the imaging device 22, a first mirror 42, a second mirror 44, a control unit 46, a mirror driving unit 48, an imaging device driver 50, an image signal processing circuit 52, an image memory 54, an image processing unit 56, a display control unit 58, an ND (neutral density) filter 80, and an ND filter driving unit 82. The image capturing apparatus main body 12 further includes the touch panel display 29, an accepting I/F 60, the accepting device 62, a medium I/F 64, and the external I/F 72.

The control unit 46 is an example of a computer in the technique of the present disclosure and includes the CPU 74, a primary storage unit 76, and a secondary storage unit 78. The CPU 74 controls the image capturing apparatus 10 as a whole. The primary storage unit 76 is a volatile memory that is used as a work area and so on when various programs are executed. Examples of the primary storage unit 76 include a RAM (random access memory). The secondary storage unit 78 of this embodiment is a nonvolatile memory that stores in advance various programs including a display control process program 79 described in detail below, various parameters, and so on. Examples of the secondary storage unit 78 include an EEPROM (electrically erasable programmable read-only memory) and a flash memory.

The CPU 74, the primary storage unit 76, and the secondary storage unit 78 are connected to a bus line 81. The mirror driving unit 48, the imaging device driver 50, the image signal processing circuit 52, and the ND filter driving unit 82 are also connected to the bus line 81. The image memory 54, the image processing unit 56, the display control unit 58, the accepting I/F 60, the medium I/F 64, and the external I/F 72 are also connected to the bus line 81.

The first mirror 42 is interposed between the photosensitive surface 22A of the imaging device 22 and the lens unit 18 and is a movable mirror that can be moved to a photosensitive surface cover position α and to a photosensitive surface open position β.

The first mirror 42 is connected to the mirror driving unit 48, and the mirror driving unit 48 is controlled by the CPU 74 to drive the first mirror 42 and place the first mirror 42 in the photosensitive surface cover position α or the photosensitive surface open position β in a selective manner. That is, in a case of not allowing the photosensitive surface 22A to receive photographic subject light, the first mirror 42 is placed in the photosensitive surface cover position α by the mirror driving unit 48, and in a case of allowing the photosensitive surface 22A to receive photographic subject light, the first mirror 42 is placed in the photosensitive surface open position β by the mirror driving unit 48.

In the photosensitive surface cover position α, the first mirror 42 covers the photosensitive surface 22A, and reflects and guides photographic subject light incoming from the lens unit 18 to the second mirror 44. The second mirror 44 reflects the photographic subject light guided by the first mirror 42 to thereby guide the photographic subject light to the viewfinder 36 through an optical system (not illustrated).

The viewfinder 36 transmits the photographic subject light guided by the second mirror 44.

In the photosensitive surface open position β, the photosensitive surface 22A covered by the first mirror 42 is uncovered, and photographic subject light is received by the photosensitive surface 22A without reflected by the first mirror 42.

The ND filter 80 of this embodiment is an ND filter having a plurality of graduated light transmittances. The light transmittances of the ND filter 80 are not limited to those of this embodiment and, for example, the ND filter 80 may have a plurality of continuous light transmittances. The ND filter 80 of this embodiment is placed between the first mirror 42 in the photosensitive surface cover position α and the imaging device 22 on the optical axis L1. The ND filter 80 is connected to the ND filter driving unit 82. The CPU 74 changes a voltage to be applied to the ND filter 80 from the ND filter driving unit 82 to thereby control the light transmittance of the ND filter 80 in accordance with a predetermined resolution. The CPU 74 thus controls the light transmittance of the ND filter 80 to thereby control the exposure of a photographic subject image formed on the imaging device 22 from the lens unit 18 through the aperture diaphragm 19. The method for controlling the light transmittance is not limited to a control method in which a physical filter having a light transmittance that is variable for each region is used but may be a control method in which the amount of exposure or the amount of received light is controlled for each of the pixels in a corresponding region of the imaging device 22 in an individual manner.

The image capturing apparatus 10 of this embodiment employs a form in which the CPU 74 performs a display control process described in detail below in a case where an instruction is given by the user using the cross key 30 or the like from menus displayed on the display 28; however, the method for the user to give an instruction for performing the display control process is not specifically limited. For example, a form may be employed in which a dedicated button or the like for the user to give an instruction for the display control process is provided on the image capturing apparatus main body 12 and the dedicated button is used to give an instruction for performing the display control process.

The imaging device driver 50 is connected to the imaging device 22 and is controlled by the CPU 74 to supply a driving pulse to the imaging device 22. Each pixel of the imaging device 22 is driven in accordance with the driving pulse supplied by the imaging device driver 50. In this embodiment, a CCD (charge-coupled device) image sensor is used as the imaging device 22; however, the technique of the present disclosure is not limited to this. For example, another image sensor, such as a CMOS (complementary metal-oxide semiconductor) image sensor, may be used.

The image signal processing circuit 52 is controlled by the CPU 74 to read an image signal for one frame from each pixel of the imaging device 22. The image signal processing circuit 52 performs various types of processing including correlative double sampling processing, automatic gain control, and A/D (analog/digital) conversion for the read image signals. The image signal processing circuit 52 outputs digitized image signals obtained as a result of various type of processing performed for the image signals to the image memory 54 on a per frame basis at a specific frame rate (for example, several tens of frames/sec.) defined by a clock signal supplied from the CPU 74.

The imaging device 22 and the imaging device driver 50 of this embodiment correspond to an example of an image capturing unit of the present disclosure.

The image memory 54 temporarily retains image signals input from the image signal processing circuit 52.

The image processing unit 56 obtains image signals from the image memory 54 at a specific frame rate on a per frame basis and performs various types of processing including gamma correction, brightness conversion, color difference conversion, and compression on the obtained image signals. The image processing unit 56 outputs image signals obtained as a result of various types of processing to the display control unit 58 at a specific frame rate on a per frame basis. Further, the image processing unit 56 outputs the image signals obtained as a result of various types of processing to the CPU 74 in response to a request from the CPU 74.

The display control unit 58 is connected to the display 28 of the touch panel display 29 and is controlled by the CPU 74 to control the display 28. The display control unit 58 outputs image signals input from the image processing unit 56 to the display 28 at a specific frame rate on a per frame basis.

The display 28 displays an image represented by image signals input from the display control unit 58 at a specific frame rate as a live preview image. The display 28 also displays a still image, which is a single-frame image obtained by single-frame image capturing. On the display 28, a playback image, a menu screen, and so on are displayed in addition to a live preview image.

The accepting device 62 has the dial 24, the release button 26, the cross key 30, the MENU/OK key 32, the BACK/DISP button 34, and so on and accepts various instructions from the user.

The touch panel 38 of the touch panel display 29 and the accepting device 62 are connected to the accepting I/F 60 and output an instruction detail signal indicating the details of an accepted instruction to the accepting I/F 60. The accepting I/F 60 outputs the input instruction detail signal to the CPU 74. The CPU 74 performs a process in accordance with the instruction detail signal input from the accepting I/F 60.

To the medium I/F 64, a memory card 66 is connected so as to be detachable and re-attachable. The medium I/F 64 is controlled by the CPU 74 to record and read an image file to and from the memory card 66.

An image file read from the memory card 66 by the medium I/F 64 is subjected to decompression by the image processing unit 56 controlled by the CPU 74 and is displayed on the display 28 as a playback image.

In the image capturing apparatus 10, the operation mode is switched in accordance with an instruction accepted by the accepting device 62. In the image capturing apparatus 10, for example, in the image capture mode, the still-image capture mode and the moving-image capture mode are selectively set in accordance with an instruction accepted by the accepting device 62. In the still-image capture mode, a still-image file can be recorded to the memory card 66. In the moving-image capture mode, a moving-image file can be recorded to the memory card 66.

In a case where an instruction for capturing a still image given by using the release button 26 is accepted in the still-image capture mode, the CPU 74 controls the imaging device driver 50 to allow the imaging device 22 to be actually exposed for one frame. The image processing unit 56 is controlled by the CPU 74 to obtain image signals obtained as a result of the exposure for one frame, perform compression on the obtained image signals, and generate a still-image file in a specific still-image format. The specific still-image format is, for example, the JPEG (Joint Photographic Experts Group) format. The still-image file is recorded to the memory card 66 through the medium I/F 64 by the image processing unit 56 controlled by the CPU 74.

In a case where an instruction for capturing a moving image given by using the release button 26 is accepted in the moving-image capture mode, the image processing unit 56 performs compression on image signals for a live preview image and generates a moving-image file in a specific moving-image format. The specific moving-image format is, for example, the MPEG (Moving Picture Experts Group) format. The moving-image file is recorded to the memory card 66 through the medium I/F 64 by the image processing unit 56 controlled by the CPU 74.

Next, as an operation of the image capturing apparatus 10 of this embodiment, an operation of the image capturing apparatus 10 to be performed in a case of performing the display control process of this embodiment will be described.

In the image capturing apparatus 10 of this embodiment, in the image capture mode, a live preview image is displayed on the touch panel display 29 as described above. In the image capturing apparatus 10 of this embodiment, for the live preview image displayed on the touch panel display 29, the display control process is performed for controlling display of the live preview image to allow comparisons of a plurality of states among which the effect (light transmittance) of the ND filter 80 is made different.

Figure 4:
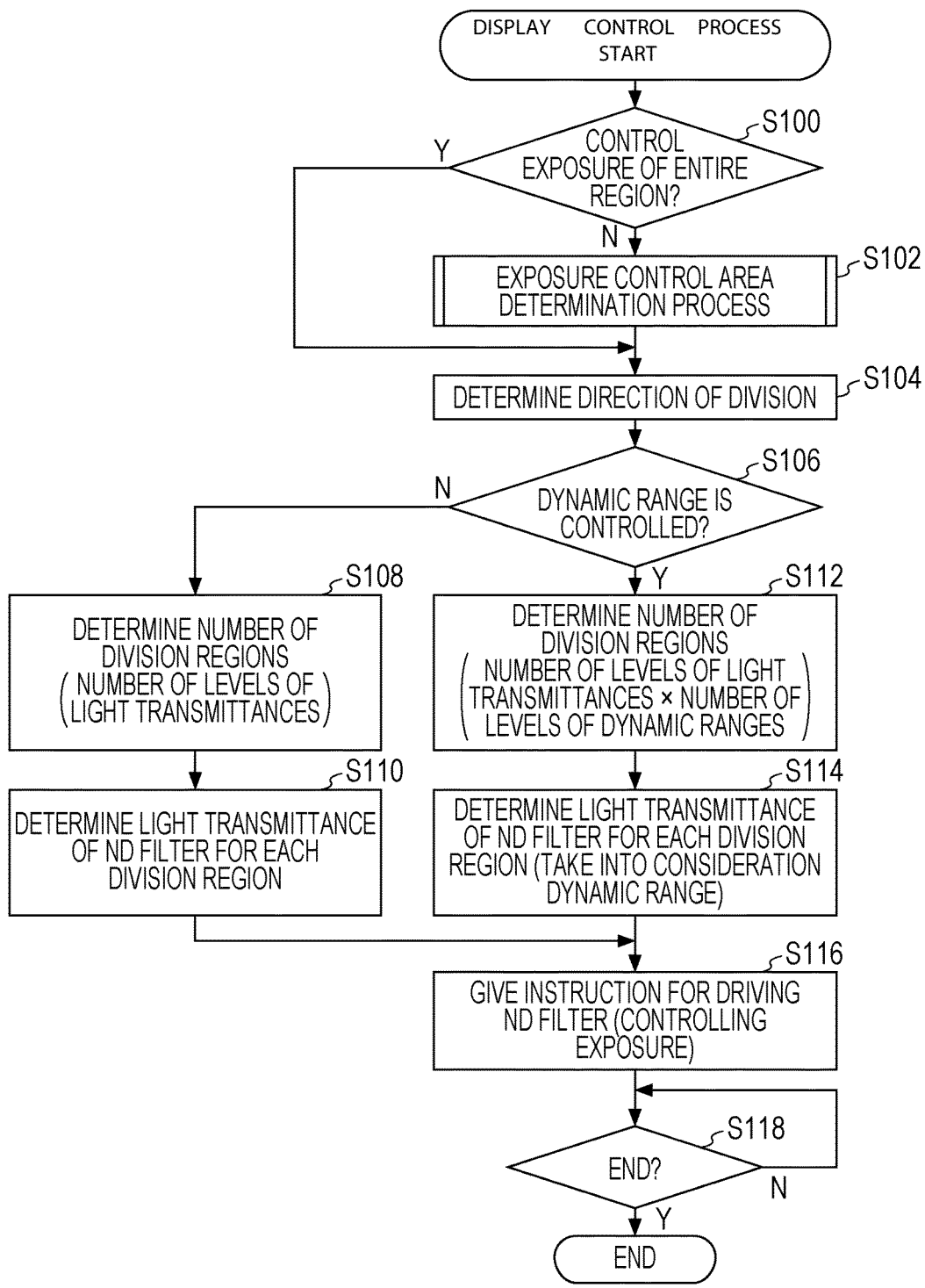
FIG. 4 is a flowchart illustrating an example flow of a display control process according to the embodiment.

Specifically, in the image capture mode, when an instruction for performing the display control process is given by the user, the CPU 74 of the image capturing apparatus 10 of this embodiment reads from the secondary storage unit 78, loads to the primary storage unit 76, and executes the display control process program 79 to thereby perform the display control process, an example of which is illustrated in FIG. 4. The CPU 74 executes the display control process program 79 to thereby function as a control unit of the present disclosure.

Figure 5:
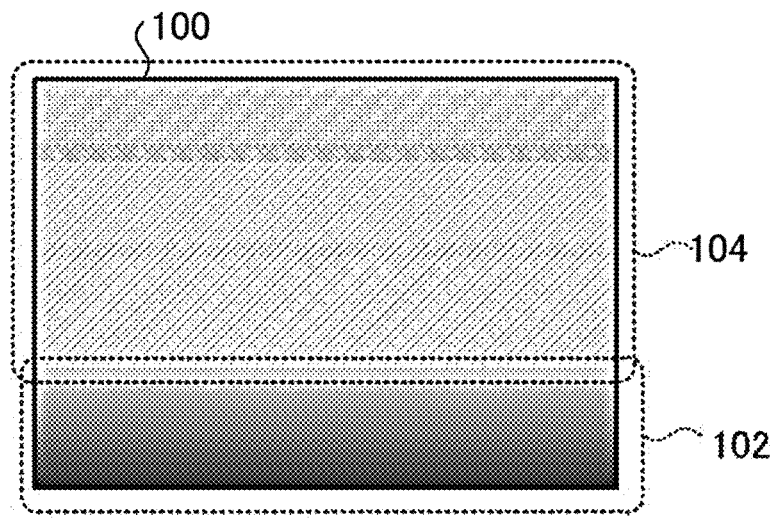
FIG. 5 is a diagram illustrating an example live preview image.

For convenience of description, a description is given below of a case where the display control process is performed for a live preview image 100, an example of which is illustrated in FIG. 5, displayed on the touch panel display 29. The live preview image 100 illustrated in FIG. 5 is the live preview image 100 obtained by capturing an image of "sea" and "sky", which are example photographic subjects, and includes a sea image 102 that mainly includes the sea and a sky image 104 that mainly includes the sky.

First, in step S100 in FIG. 4, the CPU 74 determines whether an area (area to which the ND filter 80 is applied), in the live preview image 100, for which the degree of exposure is controlled (hereinafter simply referred to as "exposure control") is the entire region of the live preview image 100.

In a case where the area for which exposure control is performed is the entire region of the live preview image 100, the result of determination in step S100 is positive, and the flow proceeds to step S104. On the other hand, in a case where the area for which exposure control is performed is not the entire region of the live preview image 100, the result of determination in step S100 is negative, and the flow proceeds to step S102.

Figure 6:
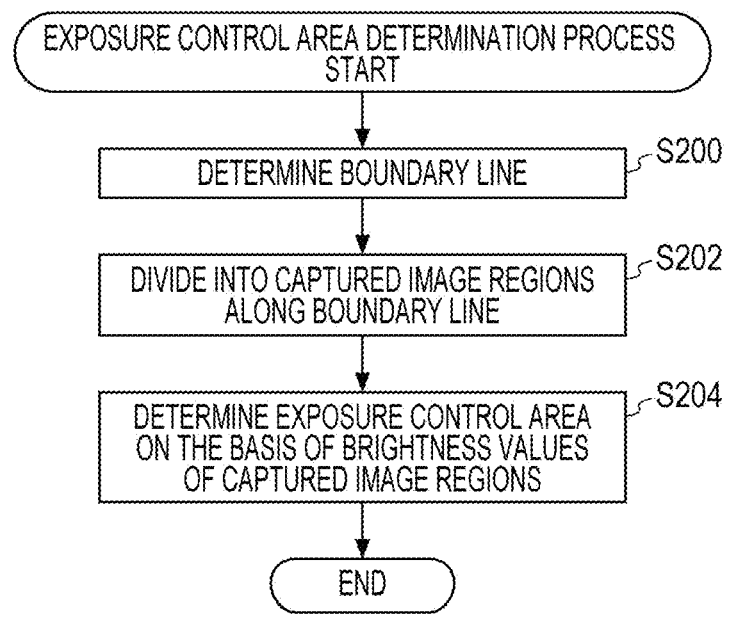
FIG. 6 is a flowchart illustrating an example flow of an exposure control area determination process according to the embodiment.

In step S102, to determine an area for which exposure control is performed in the live preview image 100, the CPU 74 performs an exposure control area determination process, an example of which is illustrated in FIG. 6.

Figure 7:
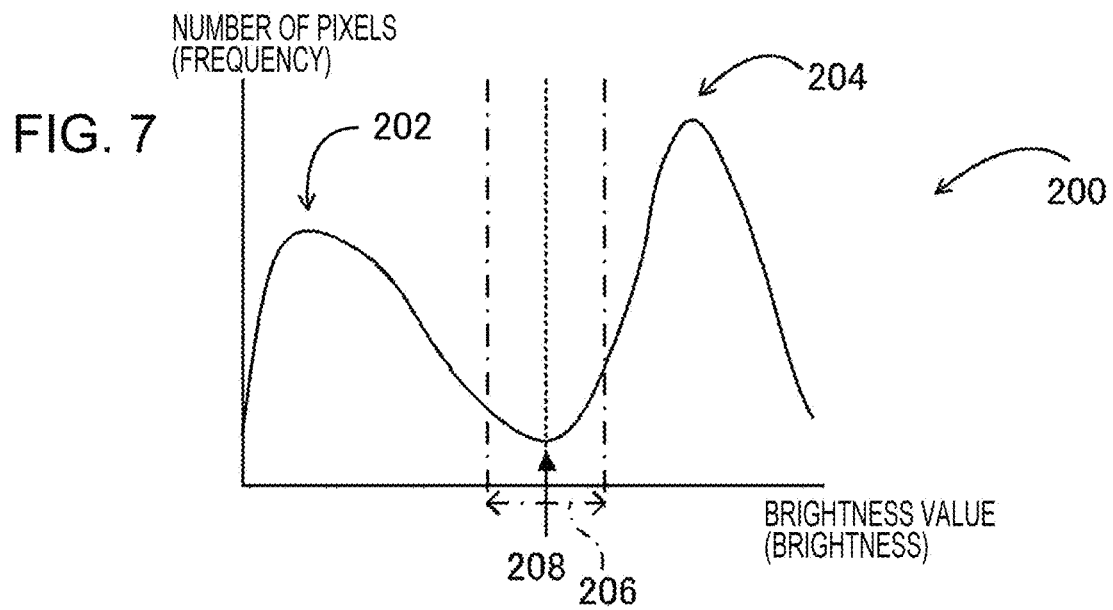
FIG. 7 is a diagram illustrating an example histogram of a live preview image.

In step S200 in FIG. 6, the CPU 74 determines a boundary line for dividing the live preview image 100 into a plurality of captured image regions on the basis of brightness values. The method for determining the boundary line in the live preview image 100 by the CPU 74 is not specifically limited. For example, the CPU 74 may determine the boundary line on the basis of a histogram (brightness distribution) obtained as a result of an image analysis of the live preview image 100. For example, a histogram 200 of the live preview image 100 is illustrated in FIG. 7. The histogram 200 illustrated in FIG. 7 represents the brightness distribution of the live preview image 100 where the horizontal axis represents the brightness value (brightness) and the vertical axis represents the number of pixels (frequency). Hereinafter, "brightness value" may be simply referred to as "brightness".

The CPU 74 detects a range 206 that corresponds to a valley between a peak 202 and a peak 204 of the brightness value from the histogram 200 and determines one specific brightness value 208 in the detected range 206 on the basis of a predetermined condition. In the predetermined condition in this case, for example, the intermediate value in the range 206 or a brightness value for which the number of pixels is smallest is specified as the brightness value to be determined. On the basis of the positions of pixels corresponding to the determined brightness value 208, the CPU 74 determines a straight line that includes the largest number of pixels having a brightness value equal to the brightness value 208 as the boundary line in the live preview image 100.

Figure 8:
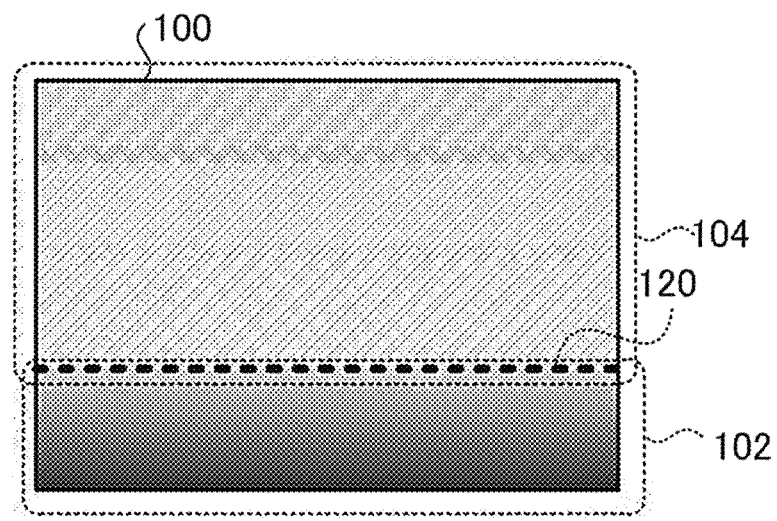
FIG. 8 is a diagram illustrating an example live preview image in a state where a boundary line is displayed in a position determined by a CPU of the image capturing apparatus.

For example, FIG. 8 illustrates a boundary line 120 that is determined in the live preview image 100. FIG. 8 illustrates a state where the boundary between the sea image 102 and the sky image 104 is determined to be the boundary line 120.

The case has been described where the histogram 200 illustrated in FIG. 7 has two portions (the peak 202 and the peak 204) that correspond to peaks of the brightness value; however, even in a case where the histogram 200 has three or more portions that correspond to peaks of the brightness value, that is, has two or more ranges 206 that correspond to valleys, the CPU 74 can determine the boundary line 120 from the histogram. In this case, for example, the CPU 74 determines, a brightness value that meets a predetermined condition specifying, for example, the smallest value, from the brightness values determined among the respective ranges 206 that correspond to the plurality of valleys, and determines the boundary line 120 on the basis of the determined brightness value.

Another method for determining the boundary line 120 may be employed in which contrasts are sequentially extracted from an end portion of the live preview image 100 on the basis of the brightness or density and, on the basis of a position in which the contrast suddenly changes, the boundary line 120 may be determined.

Figure 9:
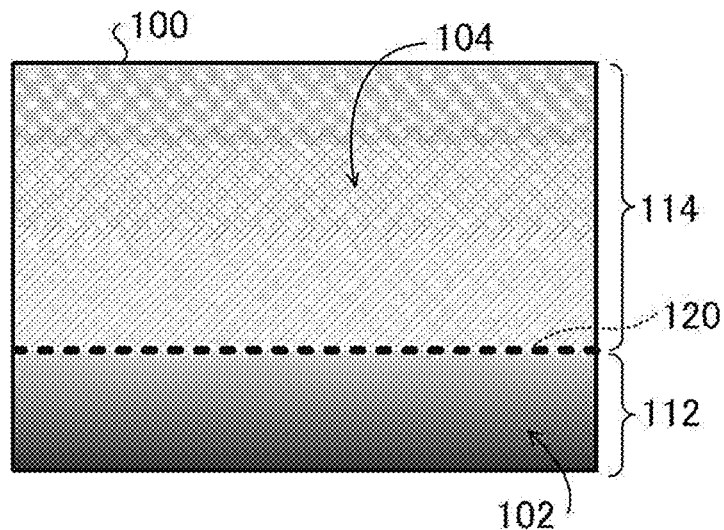
FIG. 9 is a diagram for explaining an example boundary line determined in a live preview image.

In the next step S202, the CPU 74 divides the live preview image 100 into a plurality of captured image regions along the determined boundary line 120. In this embodiment, as illustrated in FIG. 9, the live preview image 100 is divided into a captured image region 112 that includes the sea image 102 and a captured image region 114 that includes the sky image 104 along the boundary line 120.

In the next step S204, the CPU 74 determines a captured image region to be set as an exposure control area on the basis of the brightness value of each of the plurality of captured image regions (in this embodiment, the captured image region 112 and the captured image region 114), and thereafter, the exposure control area determination process ends, and the flow proceeds to step S104 in the exposure control process (see FIG. 4).

The method for determining, by the CPU 74, a captured image region to be set as the exposure control area is not specifically limited. For example, the CPU 74 may derive the average brightness value of each of the captured image regions and determine a captured image region having the highest average to be the exposure control area. In this case, a blown-out-highlights prevention effect is enhanced. For example, the CPU 74 may derive the average brightness value of each of the captured image regions and determine a captured image region having the lowest average to be the exposure control area. In this case, a blocked-up-shadows prevention effect is enhanced.

The method for determining, by the CPU 74, an area for which exposure is controlled is not limited to that of this embodiment. For example, an area for which exposure is controlled may be determined in accordance with an instruction given by the user. Examples of the method in this case include a method in which the user outlines a region in the live preview image 100 displayed on the touch panel display 29 with an instructing object and, on the basis of the brightness value of the region, a region including the region outlined by the user is determined to be an area for which exposure is controlled.

In step S104, the CPU 74 determines a direction (direction of division) in which the captured image region that is determined to be the exposure control area is divided. In this embodiment, the entire captured image region that is determined to be the exposure control area is an example of a division target region of the present disclosure, and therefore, is hereinafter referred to as "division target region".

In this embodiment, the CPU 74 divides the division target region into a plurality of regions and displays, on the touch panel display 29, images in the regions obtained as a result of division (hereinafter referred to as "division regions") as images in the respective division regions among which the effect (light transmittance) of the ND filter 80 is made different. In this step, the CPU 74 determines a direction in which the division target region is divided into the plurality of division regions, in other words, a direction in which the images among which the effect (light transmittance) of the ND filter 80 differs are arranged.

In this embodiment, the CPU 74 determines the direction of division in accordance with, for example, a photographic subject image included in the division target region. It is assumed that the ND filter 80 is typically applied to the photographic subject image. Therefore, in this embodiment, the CPU 74 divides the division target region so that part of the photographic subject image is included in a predetermined number or more of division regions among the plurality of division regions, namely, for example, more than half of the division regions, and more preferably, all of the division regions. In other words, the CPU 74 divides the division target region in accordance with the shape of the photographic subject. That is, the direction in which the division target region is divided is a direction corresponding to the shape of the division target region. In a more specific example, the CPU 74 divides the division target region in the longitudinal direction of the division target region. The method for detecting the photographic subject image by the CPU 74 is not specifically limited. For example, the CPU 74 may detect an image that satisfies a predetermined condition for a photographic subject as the photographic subject image. In the predetermined condition in this case, in a case where images of a plurality of persons are detected, an image of a person located on the nearest side (the side closest to the image capturing apparatus 10) may be detected as the photographic subject image, and in a case where, for example, an image of a landscape like the live preview image 100 is captured, an image of the sky, the sea, or the like may be detected as the photographic subject image. Alternatively, an image specified by the user may be detected as the photographic subject image.

As described above, when part of the photographic subject image is included in a predetermined number or more of division regions among the plurality of division regions, the effects of the ND filter 80 for the photographic subject image can be compared.

In the next step S106, the CPU 74 determines whether to perform image capturing in which the dynamic range is controlled. The method for determining whether to perform image capturing in which the dynamic range is controlled is not specifically limited. In this embodiment, for example, in a case where an instruction for performing image capturing in which the dynamic range is controlled is given in advance by the user using the accepting device 62 or the like, the CPU 74 determines that image capturing in which the dynamic range is controlled is to be performed.

In a case where an instruction for performing image capturing in which the dynamic range is controlled is not given, the result of determination in step S106 is negative, and the flow proceeds to step S108.

In step S108, the CPU 74 determines the number of division regions into which the division target region is divided. The ND filter 80 of this embodiment has graduated light transmittances as described above, and therefore, the CPU 74 determines the number of levels of light transmittances to be the number of division regions.

In the next step S110, the CPU 74 determines the light transmittance of the ND filter 80 for each of the plurality of division regions obtained by dividing the division target region into the number of division regions, the number being determined in step S108 described above, in the direction of division determined in step S104 described above, and thereafter, the flow proceeds to step S116. In this embodiment, the light transmittance is gradually made different (by a predetermined ratio) in the direction in which the division regions are arranged, and therefore, the CPU 74 decreases or increases the light transmittance of the ND filter 80 for the division regions in accordance with the arranged positions of the division regions.

On the other hand, in a case where an instruction for performing image capturing in which the dynamic range is controlled is given, the result of determination in step S106 is positive, and the flow proceeds to step S112.

In step S112, the CPU 74 determines the number of division regions into which the division target region is divided. In this embodiment, in the case of performing image capturing in which the dynamic range is controlled, the number of division regions is different from the number of division regions determined in step S108 described above. The image capturing apparatus 10 of this embodiment also allows comparisons of the effects of dynamic range control. Accordingly, the image capturing apparatus 10 of this embodiment performs control to display an image that differs depending on dynamic range control.

Therefore, the CPU 74 determines a number obtained by multiplexing the number of levels of light transmittances of the ND filter 80 by the number of levels of dynamic ranges to be the number of division regions. For example, in a case where the CPU 74 performs control to display an image for which the dynamic range is 100% and an image for which the dynamic range is 200%, the CPU 74 determines a number obtained by multiplying the number of levels of light transmittances by 2 to be the number of division regions.

In the next step S114, the CPU 74 determines the light transmittance of the ND filter 80 for each of the plurality of division regions obtained by dividing the division target region into the number of division regions, the number being determined in step S112 described above, in the direction of division determined in step S104 described above, and thereafter, the flow proceeds to step S116. In this embodiment, the CPU 74 performs dynamic range control by controlling the light transmittance of the ND filter 80. For example, in a case where the dynamic range for a normal exposure (light transmittance) is assumed to be 100%, the exposure is reduced to half in a case where the dynamic range is 200%, and the exposure is reduced to a quarter in a case where the dynamic range is 400%.

Therefore, in this step, unlike in step S110 described above, the CPU 74 determines the light transmittance of the ND filter 80 for each of the division regions while taking into consideration exposure control corresponding to the dynamic range.

In the next step S116, the CPU 74 outputs, to the ND filter driving unit 82, an instruction for controlling exposure by driving the ND filter 80 in accordance with the light transmittances determined in step S110 or step S114 described above.

Figure 10:
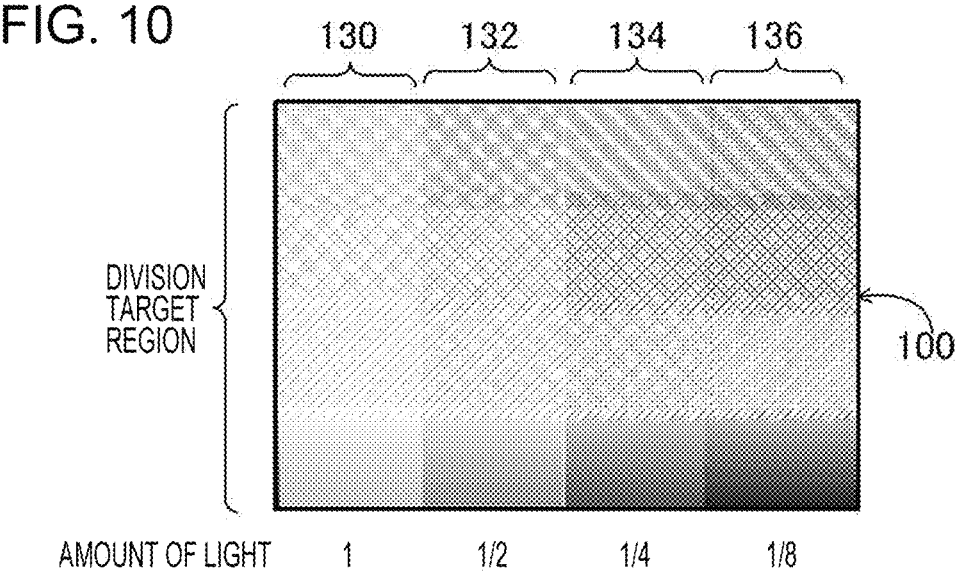
FIG. 10 is a diagram illustrating an example live preview image in a state where a plurality of states among which the effect (light transmittance) of an ND filter is made different can be compared.
Figure 11:
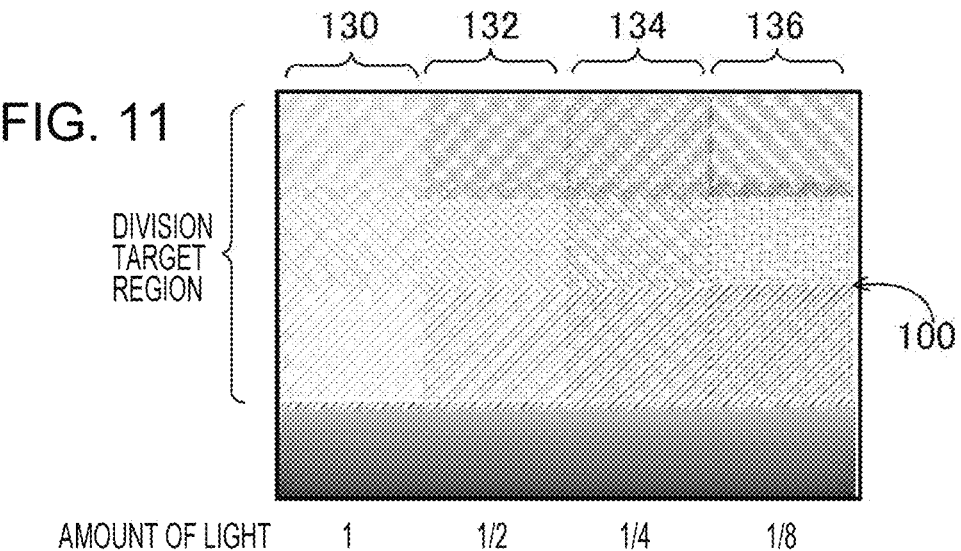
FIG. 11 is a diagram illustrating another example live preview image in a state where a plurality of states among which the effect (light transmittance) of an ND filter is made different can be compared.
Figure 12:
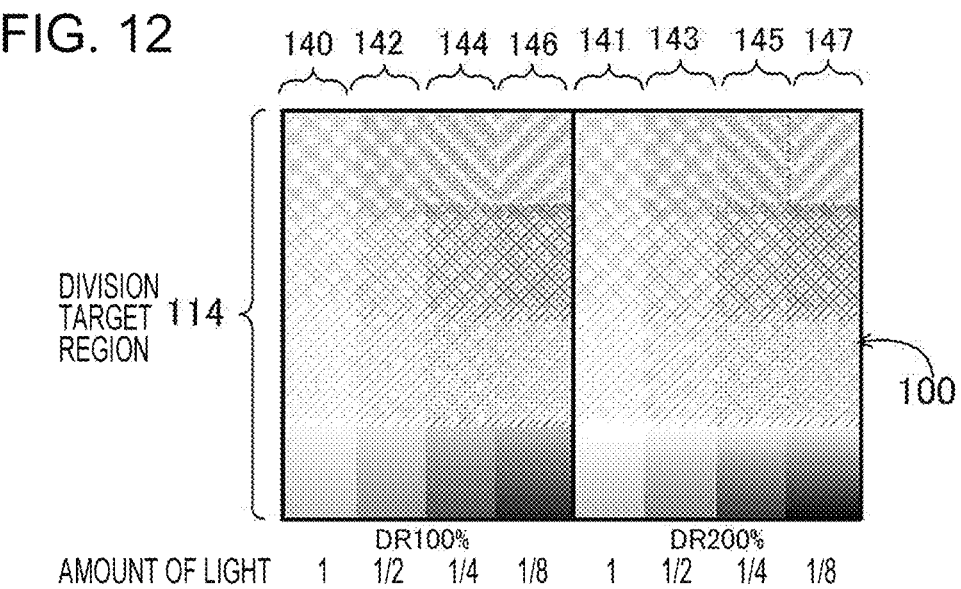
FIG. 12 is a diagram illustrating another example live preview image in a state where a plurality of states among which the effect (light transmittance) of an ND filter is made different can be compared.

When the above-described processes are thus performed, the live preview image 100 displayed on the touch panel display 29 becomes an image obtained while the degree of the ND filter 80 is controlled by the CPU 74. FIG. 10 to FIG. 12 illustrate example display of the live preview image 100 in a state where a plurality of states among which the effect (light transmittance) of the ND filter 80 are made different can be compared.

FIG. 10 illustrates example display of the live preview image 100 in a case where dynamic range control is not performed, the entire region of the live preview image 100 is determined to be the division target region, the ND filter 80 has four levels of light transmittances, and the ND filter 80 of the same light transmittance is uniformly applied.

In the example illustrated in FIG. 10, in a division region 130, the amount of light is 1 (the light transmittance of the ND filter 80 is 100%), and in a division region 132, the amount of light is ½ (the light transmittance of the ND filter 80 is 50%). In a division region 134, the amount of light is ¼ (the light transmittance of the ND filter 80 is 25%), and in a division region 136, the amount of light is ⅛ (the light transmittance of the ND filter 80 is 12.5%).

FIG. 11 illustrates example display of the live preview image 100 in a case where dynamic range control is not performed, the captured image region 114 of the live preview image 100 is determined to be the division target region, the ND filter 80 has four levels of light transmittances, and the ND filter 80 of the same light transmittance is uniformly applied.

In the example illustrated in FIG. 11, as in the case illustrated in FIG. 10, in the division region 130, the amount of light is 1 (the light transmittance of the ND filter 80 is 100%), and in the division region 132, the amount of light is ½ (the light transmittance of the ND filter 80 is 50%). In the division region 134, the amount of light is ¼ (the light transmittance of the ND filter 80 is 25%), and in the division region 136, the amount of light is ⅛ (the light transmittance of the ND filter 80 is 12.5%).

FIG. 12 illustrates example display of the live preview image 100 in a case where dynamic range control is performed, the entire region of the live preview image 100 is determined to be the division target region, the ND filter 80 has four levels of light transmittances, and the ND filter 80 of the same light transmittance is uniformly applied.

In the example illustrated in FIG. 12, in a division region 140 and a division region 141, the amount of light is 1 (the light transmittance of the ND filter 80 is 100%), and in a division region 142 and a division region 143, the amount of light is ½ (the light transmittance of the ND filter 80 is 50%). In a division region 144 and a division region 145, the amount of light is ¼ (the light transmittance of the ND filter 80 is 25%), and in a division region 146 and a division region 147, the amount of light is ⅛ (the light transmittance of the ND filter 80 is 12.5%). Further, in the division regions 140, 142, 144, and 146, the dynamic range (DR) is controlled to 100%, and in the division regions 141, 143, 145, and 147, the dynamic range (DR) is controlled to 200%.

In the next step S118, the CPU 74 determines whether to end the display control process. In a case where the display control process is not to be ended, the result of determination in step S118 is negative, which corresponds to a standby state. On the other hand, in a case where the display control process is to be ended, the result of determination in step S118 is positive, and the display control process ends.

Thereafter, the user specifies the level (light transmittance) of the ND filter 80 and the level of the dynamic range by using the accepting device 62, the touch panel display 29, or the like. When the user gives an instruction for image capturing by using the release button 26, an image obtained by image capturing by the imaging device 22 in a state where the exposure is controlled by the CPU 74 is recorded to the memory card 66.

As described above, the image capturing apparatus 10 of this embodiment includes the imaging device driver 50, the touch panel display 29, and the CPU 74. The imaging device driver 50 outputs image signals obtained by image capturing of a photographic subject by the imaging device 22 through the lens unit 18. The touch panel display 29 displays the live preview image 100 based on the image signals. The CPU 74 performs control to display, on the touch panel display 29, images in the plurality of division regions obtained by dividing the division target region that includes the photographic subject image in the live preview image 100 as images in the respective division regions among which the degree of exposure differs.

Accordingly, with the image capturing apparatus 10 of this embodiment, as described above, the CPU 74 displays the live preview image 100 on the touch panel display 29 as an image in which the degree of exposure differs among the plurality of division regions obtained by dividing the division target region including the photographic subject image. Therefore, it is possible to perform image capturing while comparing the effects of the ND filter.

In this embodiment, dynamic range control is performed by controlling the light transmittance of the ND filter 80; however, the method for dynamic range control is not limited to this. For example, the amount of exposure may be controlled by a combination of the value of the aperture diaphragm 19 and the shutter speed to thereby control the dynamic range.

In this embodiment, the case where images among which the degree of dynamic range control differs are displayed in different division regions of the live preview image 100, in other words, the case where images among which the degree of dynamic range control differs are displayed on the same screen of the touch panel display 29, has been described. However, the method for displaying images among which dynamic range control differs on the touch panel display 29 is not limited to this. For example, switching between the live preview image 100 for which the dynamic range is 100% and the live preview image 100 for which the dynamic range is 200% may be performed with a toggle or the like to thereby switch an image to be displayed on the touch panel display 29.

The method for determining the number of division regions and the direction of division in accordance with the photographic subject image included in the division target region is not limited to the above-described method.

For example, the number of division regions and the direction of division may be determined by using a method described below.

Figure 13:
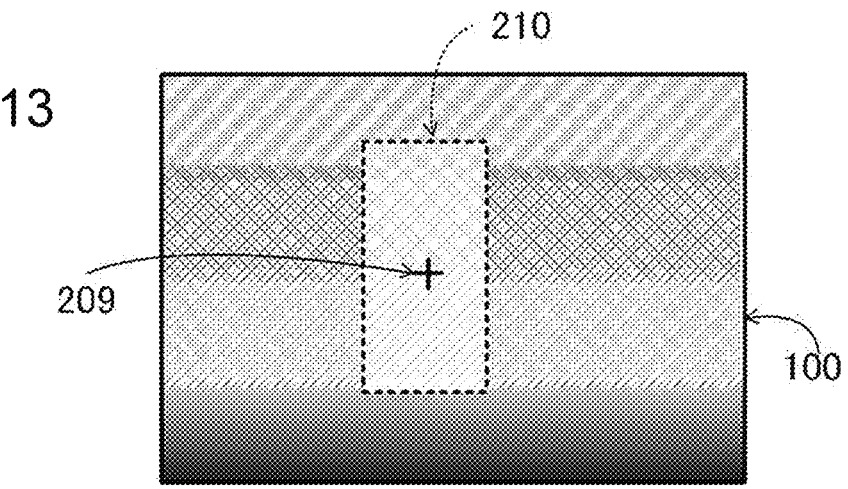
FIG. 13 is a diagram for explaining a method for determining the number of division regions and the direction of division.

In general, as in the example illustrated in FIG. 13, it is assumed that the photographic subject image is located near a target 209 that is the reference of AF, namely, for example, near the center portion of the live preview image 100. Accordingly, the CPU 74 assumes the target 209 as the reference and detects pixels, in the neighborhood of the target 209, similar to the pixel of the target 209 on the basis of a predetermined condition. In the predetermined condition, for example, a pixel having a brightness for which the difference from the brightness of the pixel of the target 209 is within a predetermined range is specified. In this case, the CPU 74 regards a region formed of pixels having brightnesses for which the differences from the brightness of the pixel of the target 209 are within the predetermined range as the photographic subject image, and determines the region that includes the pixels and is regarded as the photographic subject image to be a division target region 210. The CPU 74 divides the division target region 210 into a plurality of division regions (division regions 212, 214, and 216) in accordance with, for example, the size of the division target region 210 (the photographic subject image), as in the example illustrated in FIG. 14. The number of division regions is a number corresponding to the size of the photographic subject image. More specifically, for example, as the size of the photographic subject image increases, the number of division regions increases. The example illustrated in FIG. 14 is a case where the light transmittance of the ND filter 80 for the division region 212 is highest, the light transmittance of the ND filter 80 for the division region 216 is lowest, and the light transmittance of the ND filter 80 for the division region 214 is an intermediate value.

Figure 14:
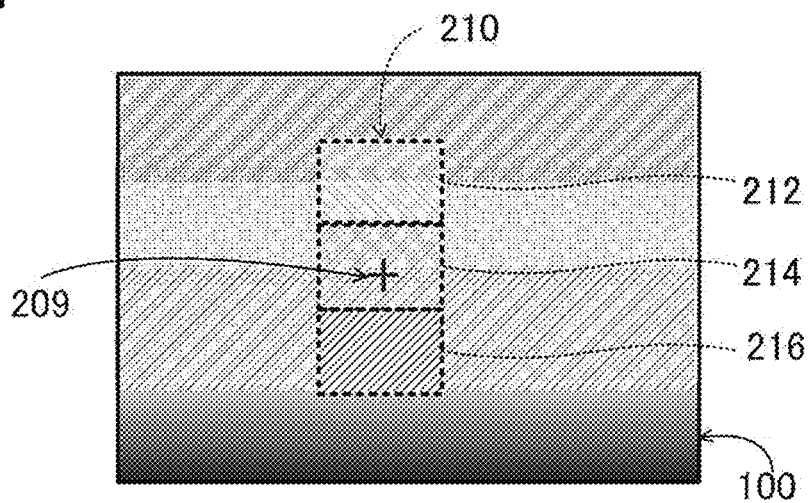
FIG. 14 is a diagram for explaining another method for determining the number of division regions and the direction of division.
Figure 15:
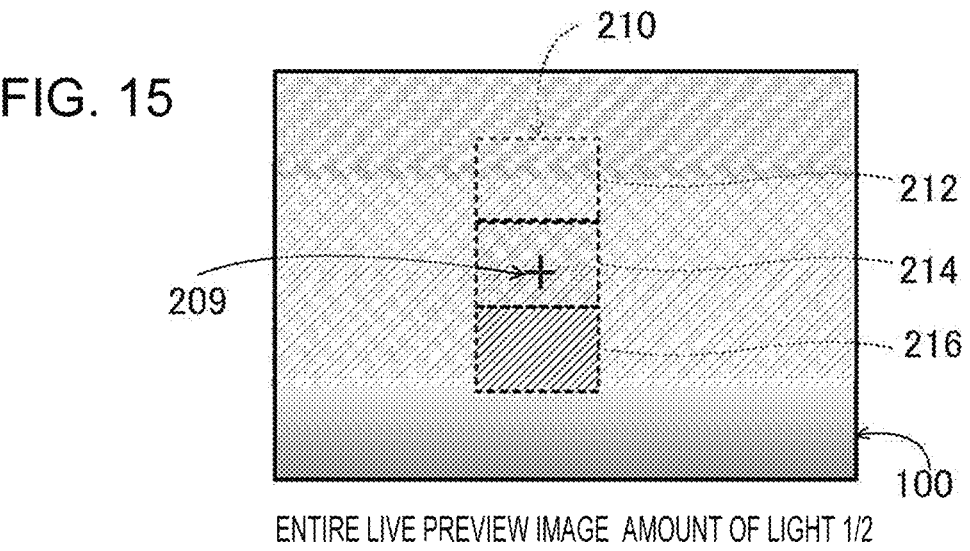
FIG. 15 is a diagram illustrating example display of a live preview image in a case where the amount of light in the entire live preview image is controlled to ½ by an ND filter.

As in the example illustrated in FIG. 14, in the case where a partial region of the live preview image 100 is the division target region, exposure control by the ND filter 80 may be performed also for a region other than the division target region in the live preview image 100 or for the entire region. As an example of this case, FIG. 15 illustrates display example of the live preview image 100 in a case where the amount of light in the entire live preview image 100 is controlled by the ND filter 80 to ½.

Figure 16:
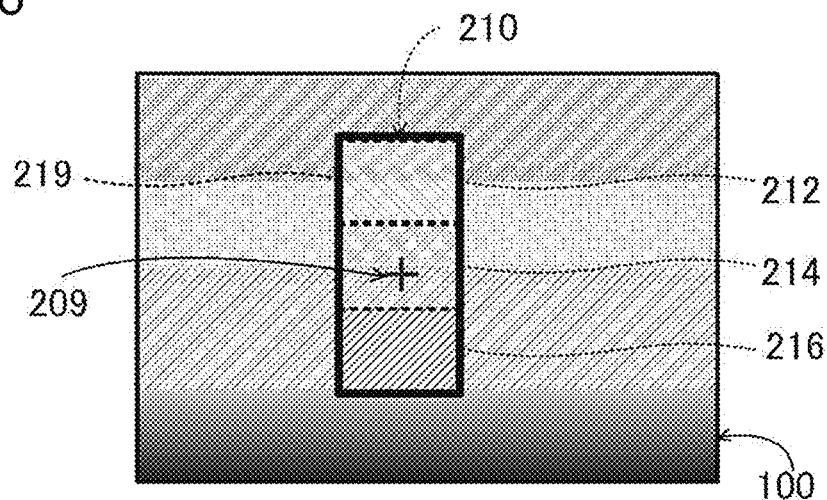
FIG. 16 is a diagram illustrating example marking of division regions.

As in the example illustrated in FIG. 16, for example, marking for explicitly indicating the division target region 210 may be performed. FIG. 16 illustrates an example state where marking is performed to outline the division target region 210 with a frame line 219.

Figure 17:
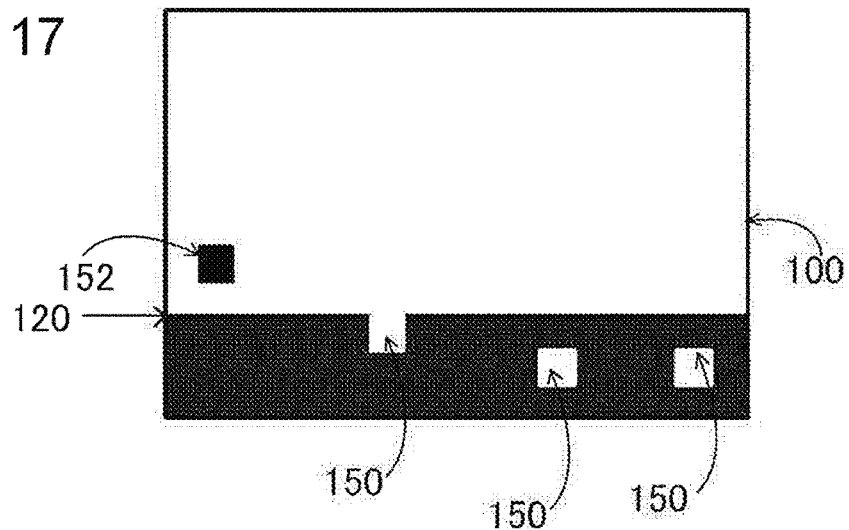
FIG. 17 is a diagram for explaining a method for dividing a live preview image into a plurality of captured image regions on the basis of brightness values.
Figure 18:
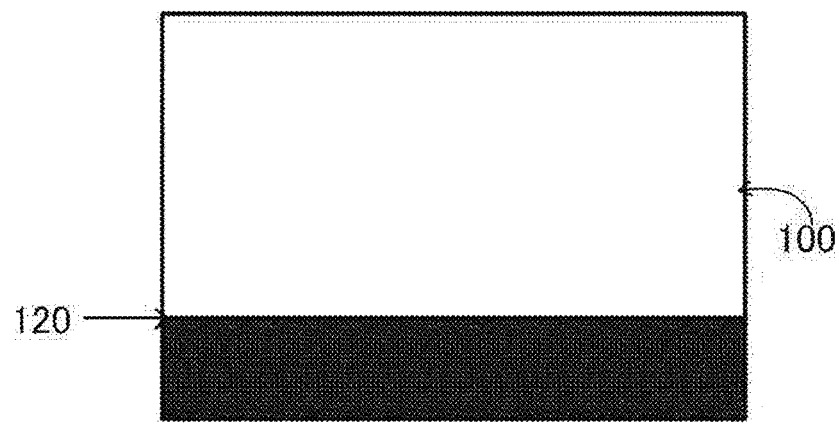
FIG. 18 is a diagram for explaining another method for dividing a live preview image into a plurality of captured image regions on the basis of brightness values.

The method for dividing the live preview image 100 into a plurality of captured image regions on the basis of brightness values is not limited to the above-described form. For example, as described above, the brightness of the boundary line 120 determined by the CPU 74 may be used as a threshold value and the live preview image 100 may be converted to, for example, a binary representation thereof to thereby divide the live preview image 100 into a plurality of captured image regions. FIG. 17 illustrates an example of the live preview image 100 in its binary representation state. As illustrated in FIG. 17, in this case, pixels, such as pixels 150 and a pixel 152, different in brightness from the surrounding pixels may be present. Therefore, the CPU 74 performs, for example, a dilation-erosion process to thereby reshape the regions having respective brightnesses. FIG. 18 illustrates an example live preview image after a dilation-erosion process.

Figure 19:
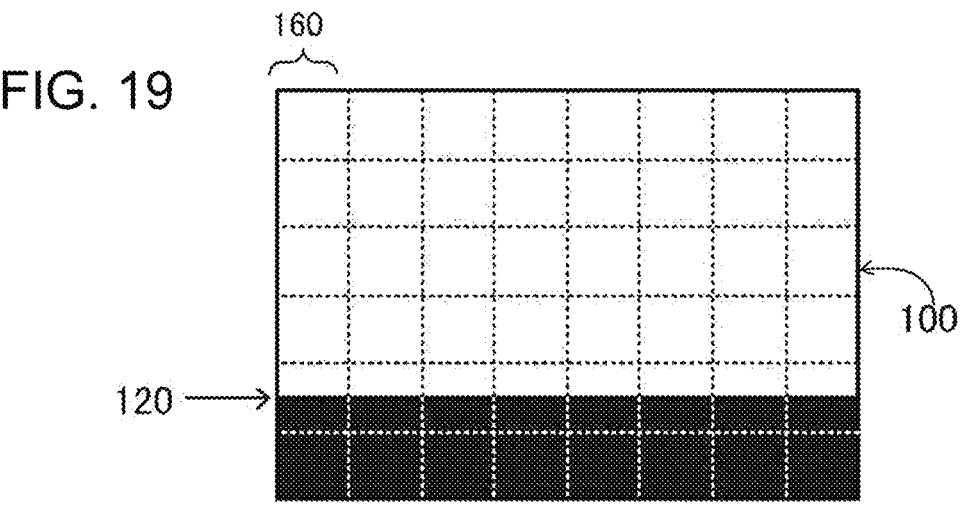
FIG. 19 is a diagram for explaining another method for dividing a live preview image into a plurality of captured image regions on the basis of brightness values.

Here, for example, as illustrated in FIG. 19, in a case where the resolution with which an ND filter process is performed by the ND filter 80, the resolution being represented by units 160, is lower than the resolution of the live preview image 100, the boundary line 120 between the captured image regions may be included in one unit 160, as illustrated in FIG. 19. The resolution represented by the units 160 with which the ND filter process is performed is an example of a first resolution of the present disclosure, and the resolution of the live preview image 100 is a second resolution of the present disclosure.

Figure 20:
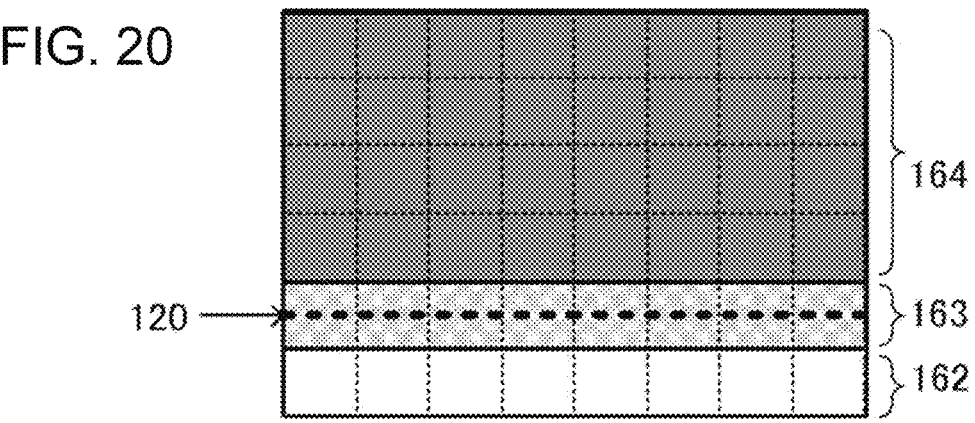
FIG. 20 is a diagram for explaining another method for dividing a live preview image into a plurality of captured image regions on the basis of brightness values.

In such a case, it is preferable to divide the live preview image 100 into captured image regions on the basis of the resolution of the live preview image 100 and to convert the live preview image 100 on the basis of the captured image regions obtained as a result of division so as to have the resolution represented by the units 160 with which the ND filter process is performed. When the live preview image 100 is thus divided, the live preview image 100 can be divided into three regions, namely, a captured image region 162, a captured image region 163, and a captured image region 164, as in the example illustrated in FIG. 20. In other words, the live preview image 100 becomes a multilevel image, and the ND filter 80 having light transmittances corresponding to the respective densities (brightnesses) of the captured image regions 162, 163, and 164 can be applied.

In the case where the live preview image 100 is thus divided into a plurality of captured image regions, unlike the case where the live preview image 100 is simply divided into two captured image regions (see the captured image regions 112 and 114 in FIG. 9 described above) in accordance with the brightness of the boundary line 120, the light transmittance of the ND filter 80 can be made different in a multilevel manner. Therefore, the occurrence of a false boundary due to a variance in the brightness near the boundary line 120 can be suppressed. Accordingly, with the image capturing apparatus 10 of this embodiment, a captured image having high image quality can be obtained.

In the above-described embodiment, the form has been described in which the CPU 74 uses the ND filter 80 and the ND filter driving unit 82 to control the degree (light transmittance) of the ND filter 80, thereby controlling the exposure; however, the form for controlling the exposure by the ND filter process is not limited to this. For example, a form may be employed in which the CPU 74 controls the image signal processing circuit 52 to control the gains of image signals output from the imaging device 22, thereby performing the ND filter process to control the exposure. Further, for example, a form may be employed in which the CPU 74 controls the shutter speed, thereby performing the ND filter process to control the exposure.

Figure 21:
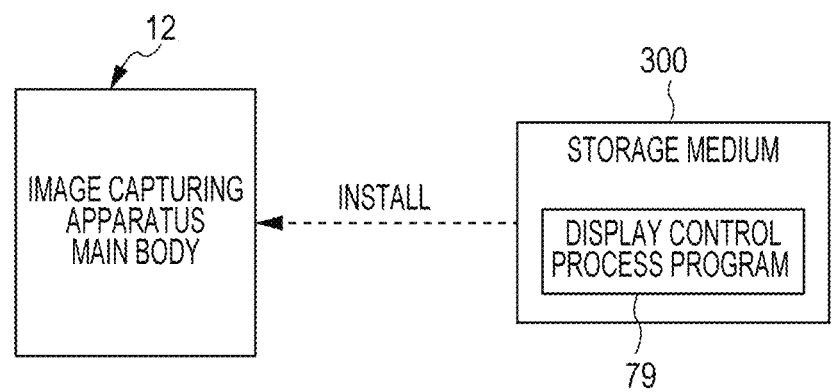
FIG. 21 is a schematic diagram illustrating an example form in which a display control process program according to the embodiment is installed on an image capturing apparatus main body from a storage medium in which the display control process program is stored.

In the above-described embodiment, the example case where the display control process program is read from the secondary storage unit 78 has been described; however, the display control process program need not be stored in the secondary storage unit 78 at the beginning. For example, as illustrated in FIG. 21, the display control process program 79 may be stored in advance in any portable storage medium 300, such as an SSD (solid state drive), a USB (universal serial bus) memory, or a CD-ROM (compact disc read-only memory). In this case, the display control process program 79 stored in the storage medium 300 is installed on the image capturing apparatus main body 12, and the installed display control process program 79 is executed by the CPU 74.

Alternatively, the display control process program 79 may be stored in advance in a storage unit of another computer, server apparatus, or the like connected to the image capturing apparatus main body 12 via a communication network (not illustrated), and the display control process program 79 may be downloaded in response to a request from the image capturing apparatus main body 12. In this case, the downloaded display control process program 79 is executed by the CPU 74.

The display control process described in the above-described embodiment is only an example. Therefore, an unnecessary step may be deleted, a new step may be added, or the order of processes may be changed without departing from the spirit, as a matter of course.

In the above-described embodiment, the example case where the display control process is implemented by using a software configuration using a computer has been described; however, the technique of the present disclosure is not limited to this. For example, instead of the software configuration using a computer, the display control process may be performed by using only a hardware configuration, such as an FPGA (field-programmable gate array) or an ASIC (application specific integrated circuit). Alternatively, the display control process may be performed by using a configuration obtained by combining the software configuration and the hardware configuration.

All documents, patent applications, and technical standards described in this specification are incorporated herein by reference to the same extent as in a case where the documents, patent applications, and technical standards are specifically and individually described as being incorporated herein by reference.

REFERENCE SIGNS LIST 10 image capturing apparatus
12 image capturing apparatus main body
13, 15 mount
14 image capturing lens
16 focus ring
18 lens unit
19 aperture diaphragm
20 focus lens
22 imaging device
22A photosensitive surface
24 dial
26 release button
28 display
29 touch panel display
30 cross key
32 MENU/OK key
34 BACK/DISP button
36 viewfinder
38 touch panel
40 control device
42 first mirror
44 second mirror 46 control unit
48 mirror driving unit
50 imaging device driver
52 image signal processing circuit
54 image memory
56 image processing unit
58 display control unit
60 accepting I/F
62 accepting device
64 medium I/F
66 memory card
72 external I/F
74 CPU
76 primary storage unit
78 secondary storage unit
79 display control process program
80 ND filter
81 bus line
82 ND filter driving unit
100 live preview image
102 sea image
104 sky image
112, 114, 162, 163, 164 captured image region
120 boundary line
130, 132, 134, 136, 140, 141, 142, 143, 144, 145, 146, 147, 212, 214, 216 division region
150, 152 pixel
160 unit
200 histogram
202, 204 peak
206 range
208 brightness value
209 target
210 division target region
219 frame line
300 storage medium
α photosensitive surface cover position
β photosensitive surface open position
L1 optical axis

What is claimed is:

1. An image capturing apparatus comprising:
an image sensor that outputs an image signal obtained by image capturing of a photographic subject by an imaging device through an image capturing optical system;
a display that displays a captured image based on the image signal; and
a processor configured to perform control to display, on the display, images in a plurality of division regions obtained by dividing a division target region that includes a photographic subject image in the captured image as images in the respective division regions among which a degree of exposure differs,
wherein the processor further configured to make the degree of exposure different among the plurality of division regions by a predetermined ratio in a direction in which the plurality of division regions are arranged,
wherein the number of the plurality of division regions is a number corresponding to a size of the photographic subject image.

2. The image capturing apparatus according to claim 1, wherein
the division target region is divided in a direction corresponding to a shape of the division target region.

3. The image capturing apparatus according to claim 1, wherein
the processor configured to extract, from the captured image as the division target region, at least one photographic subject region that is a partial region of the captured image and that includes a photographic subject image, and perform control to display, on the display, images in a plurality of division regions obtained by dividing the extracted photographic subject region as images in the respective division regions among which a degree of exposure differs.

4. The image capturing apparatus according to claim 1, wherein
the processor configured to divide the captured image into a plurality of captured image regions different from the plurality of division regions and control a degree of exposure of an captured image region, among the plurality of captured image regions, for which the processor configured to control the degree of exposure to a degree of exposure of an image corresponding to one of the plurality of division regions.

5. The image capturing apparatus according to claim 4, wherein
the plurality of division regions each include part of the captured image region for which the degree of exposure is controlled.

6. The image capturing apparatus according to claim 5, wherein
the processor configured to set a region having a brightness higher than a predetermined threshold value in the captured image as the captured image region for which the processor configured to control the degree of exposure.

7. The image capturing apparatus according to claim 4, wherein
the processor configured to set a region having a brightness higher than a predetermined threshold value in the captured image as the captured image region for which the processor configured to control the degree of exposure.

8. The image capturing apparatus according to claim 4, wherein
the processor configured to derive a histogram that represents a correspondence between a brightness of the captured image and the number of pixels and use a boundary line derived from the captured image on the basis of a brightness, in the histogram, satisfying a predetermined condition to divide the captured image into the plurality of captured image regions.

9. The image capturing apparatus according to claim 8, wherein
the processor configured to set a brightness value corresponding to a valley between peaks of the brightness in the histogram as the brightness of the boundary line.

10. The image capturing apparatus according to claim 8, wherein
in a case where a first resolution that represents a unit with which the degree of exposure is controlled is lower than a second resolution of the captured image, the processor configured to divide the captured image into a plurality of regions by using the boundary line in accordance with the second resolution, and divide the captured image into a plurality of captured image regions corresponding to the first resolution on the basis of the plurality of regions.

11. The image capturing apparatus according to claim 1, wherein
the processor configured to control a degree of exposure of the captured image to a degree of exposure corresponding to an image that corresponds to a division region selected from among the plurality of division regions displayed on the display.

12. The image capturing apparatus according to claim 1, wherein
the processor further configured to control a dynamic range of the division target region.

13. A control method for an image capturing apparatus, the control method including a process comprising:
displaying, on a display, a captured image based on an image signal obtained by image capturing of a photographic subject by an imaging device through an image capturing optical system; and
performing control to display, on the display, images in a plurality of division regions obtained by dividing a division target region that includes a photographic subject image in the captured image as images in the respective division regions among which a degree of exposure differs,
wherein the control makes the degree of exposure different among the plurality of division regions by a predetermined ratio in a direction in which the plurality of division regions are arranged,
wherein the number of the plurality of division regions is a number corresponding to a size of the photographic subject image.

14. A non-transitory computer readable medium having a control program for an image capturing apparatus, the control program causing a computer to perform a process comprising:
displaying, on a display, a captured image based on an image signal obtained by image capturing of a photographic subject by an imaging device through an image capturing optical system; and
performing control to display, on the display, images in a plurality of division regions obtained by dividing a division target region that includes a photographic subject image in the captured image as images in the respective division regions among which a degree of exposure differs,
wherein the control makes the degree of exposure different among the plurality of division regions by a predetermined ratio in a direction in which the plurality of division regions are arranged,
wherein the number of the plurality of division regions is a number corresponding to a size of the photographic subject image.

* * * * *